(12) United States Patent
Squibbs

(10) Patent No.: US 7,623,843 B2
(45) Date of Patent: Nov. 24, 2009

(54) WIRELESS COMMUNICATION COST PREDICTION FOR MOBILE DEVICE

(75) Inventor: Robert Francis Squibbs, Easter Compton Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1332 days.

(21) Appl. No.: 10/405,196

(22) Filed: Apr. 2, 2003

(65) Prior Publication Data

US 2003/0232614 A1 Dec. 18, 2003

(30) Foreign Application Priority Data

Jun. 15, 2002 (GB) ................. 0213844.4

(51) Int. Cl.
*H04M 11/00* (2006.01)
*H04Q 7/20* (2006.01)
*H04L 29/06* (2006.01)
*H04B 7/00* (2006.01)

(52) U.S. Cl. ............. 455/407; 455/452.2; 455/41.2; 455/445; 455/414.3

(58) Field of Classification Search ........... 455/406, 455/452.2, 407, 41.2, 445, 414.3; 379/221.05
See application file for complete search history.

(56) References Cited

U.S. PATENT DOCUMENTS

| | | | |
|---|---|---|---|
| 4,751,728 A | 6/1988 | Treat | |
| 5,684,861 A | 11/1997 | Lewis et al. | |
| 5,862,471 A * | 1/1999 | Tiedemann et al. | 455/406 |
| 5,974,308 A * | 10/1999 | Vedel | 455/407 |
| 6,058,312 A * | 5/2000 | Kimura | 455/445 |
| 6,148,191 A * | 11/2000 | Kim | 455/407 |
| 6,195,543 B1 * | 2/2001 | Granberg | 455/407 |
| 6,246,870 B1 * | 6/2001 | Dent et al. | 455/405 |
| 6,326,918 B1 * | 12/2001 | Stewart | 342/457 |
| 6,404,864 B1 | 6/2002 | Evslin et al. | |
| 6,556,817 B1 * | 4/2003 | Souissi et al. | 455/406 |
| 6,741,850 B1 * | 5/2004 | Park | 455/407 |
| 6,813,488 B2 * | 11/2004 | Marsh et al. | 455/406 |
| 6,920,327 B1 * | 7/2005 | Brandes et al. | 455/452.1 |
| 6,934,558 B1 * | 8/2005 | Sainton et al. | 455/552.1 |
| 7,072,639 B2 * | 7/2006 | Marsh et al. | 455/406 |
| 7,366,290 B2 * | 4/2008 | Ritter et al. | 379/114.2 |
| 2001/0009855 A1 | 7/2001 | I'Anson | |
| 2001/0037269 A1 * | 11/2001 | Marsh et al. | 705/34 |

(Continued)

FOREIGN PATENT DOCUMENTS

EP 0996275 A2 4/2000

(Continued)

*Primary Examiner*—Olisa Anwah
*Assistant Examiner*—Lisa Hashem

(57) ABSTRACT

A mobile device is equipped with a communications subsystem capable of wireless communication with a communications infrastructure using any of multiple different data-transfer services each with an associated cost. A service determination subsystem of the device uses a currently-active quality-of-experience profile to determine what service or services are to be used by the communications subsystem. A cost prediction arrangement is provided for predicting, on the basis of past data transfers involving the device, communication costs for the device to the end of a current usage period for at least one quality-of-experience profile used as the currently-active profile for future communications in the usage period. The cost prediction arrangement can be part of the mobile device or hosted by a remote system.

20 Claims, 5 Drawing Sheets

U.S. PATENT DOCUMENTS

| | | | |
|---|---|---|---|
| 2001/0044743 A1* | 11/2001 | McKinley et al. | 705/14 |
| 2002/0072333 A1* | 6/2002 | Gnesda et al. | 455/67.1 |
| 2002/0164992 A1 | 11/2002 | Olsen | |
| 2003/0157925 A1* | 8/2003 | Sorber et al. | 455/406 |
| 2004/0077332 A1* | 4/2004 | Ephraim et al. | 455/405 |
| 2008/0132201 A1* | 6/2008 | Karlberg | 455/407 |

FOREIGN PATENT DOCUMENTS

| | | |
|---|---|---|
| EP | 1058466 A2 | 12/2000 |
| GB | 2358766 A | 1/2000 |
| GB | 2349541 A | 11/2000 |
| JP | 07-143234 | 6/1995 |
| WO | WO88/07797 | 10/1988 |
| WO | WO01/41488 A2 * | 6/2001 |

\* cited by examiner

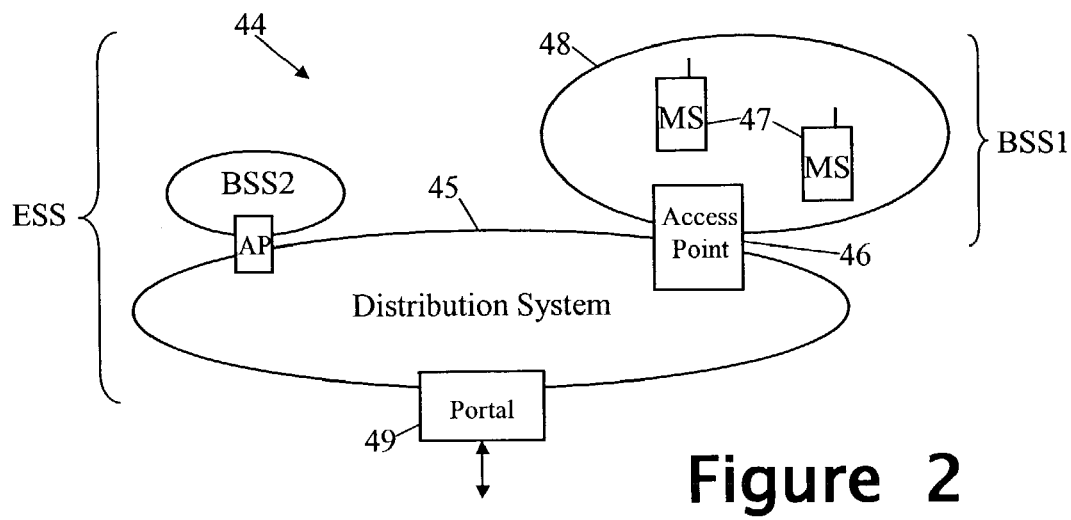
Figure 2
(PRIOR ART)
Figure 3
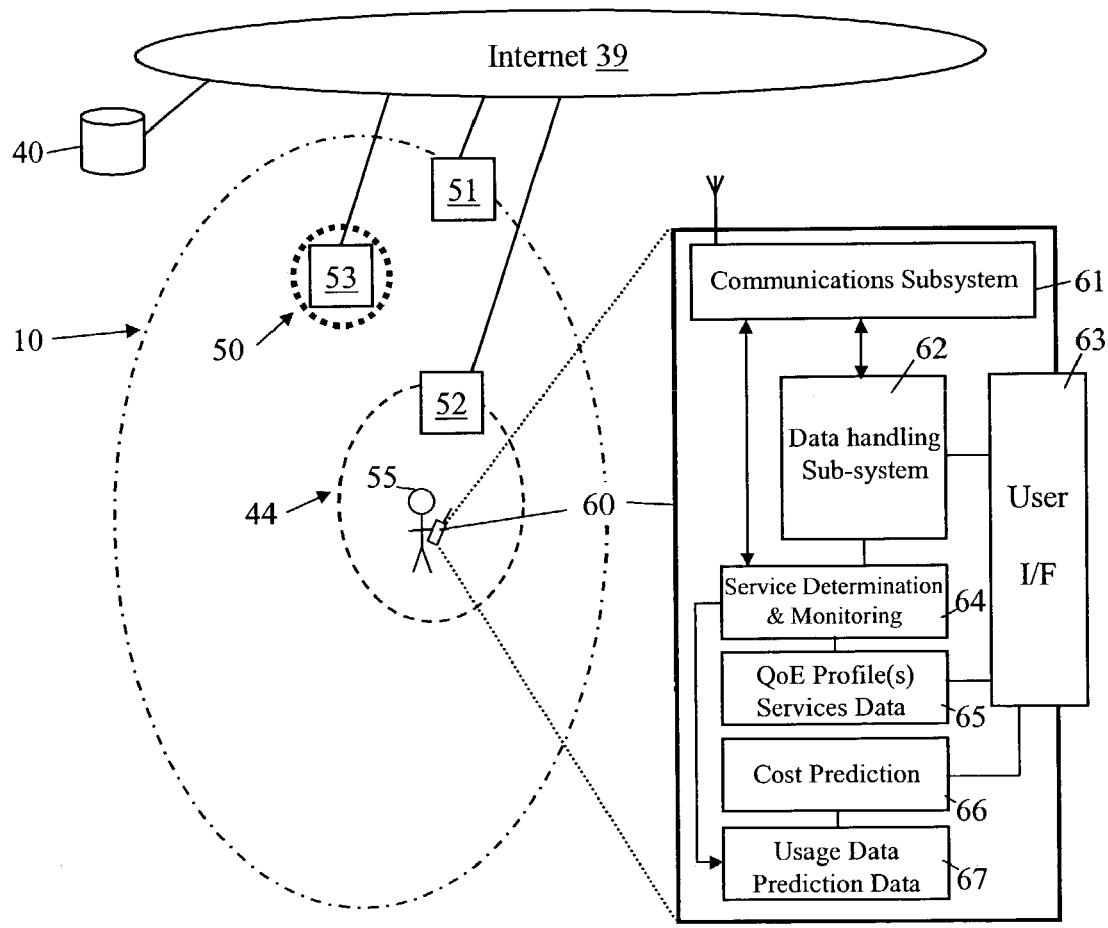

WIRELESS COMMUNICATION COST PREDICTION FOR MOBILE DEVICE

FIELD OF THE INVENTION

The present invention relates to the prediction of communication costs for a mobile device equipped for wireless communication.

BACKGROUND OF THE INVENTION

Communication infrastructures suitable for mobile users have now become widely adopted. Whilst the primary driver has been mobile telephony using cellular radio infrastructures, the desire to implement mobile data-based services over these infrastructures, has led to the rapid development of data-capable bearer services across such infrastructures. This has opened up the possibility of many Internet-based services being available to mobile users.

By way of example, FIG. 1 shows one form of known communication infrastructure for mobile users providing both telephony and data-bearer services. In this example, a mobile entity 20, provided with a radio subsystem 22 and a phone subsystem 23, communicates with the fixed infrastructure of GSM PLMN (Public Land Mobile Network) 10 to provide basic voice telephony services. In addition, the mobile entity 20 includes a data-handling subsystem 25 interworking, via data interface 24, with the radio subsystem 22 for the transmission and reception of data over a data-capable bearer service provided by the PLMN; the data-capable bearer service enables the mobile entity 20 to communicate with a service system 40 connected to the public Internet 39. The data handling subsystem 25 supports an operating environment 26 in which applications run, the operating environment including an appropriate communications stack.

More particularly, the fixed infrastructure 10 of the GSM PLMN comprises one or more Base Station Subsystems (BSS) 11 and a Network and Switching Subsystem NSS 12. Each BSS 11 comprises a Base Station Controller (BSC) 14 controlling multiple Base Transceiver Stations (BTS) 13 each associated with a respective "cell" of the radio network. When active, the radio subsystem 22 of the mobile entity 20 communicates via a radio link with the BTS 13 of the cell in which the mobile entity is currently located. As regards the NSS 12, this comprises one or more Mobile Switching Centers (MSC) 15 together with other elements such as Visitor Location Registers 32 and Home Location Register 32.

When the mobile entity 20 is used to make a normal telephone call, a traffic circuit for carrying digitised voice is set up through the relevant BSS 11 to the NSS 12 which is then responsible for routing the call to the target phone (whether in the same PLMN or in another network).

With respect to data transmission to/from the mobile entity 20, in the present example three different data-capable bearer services are depicted though other possibilities exist. A first data-capable bearer service is available in the form of a Circuit Switched Data (CSD) service; in this case a full traffic circuit is used for carrying data and the MSC 32 routes the circuit to an InterWorking Function IWF 34 the precise nature of which depends on what is connected to the other side of the IWF. Thus, IWF could be configured to provide direct access to the public Internet 39 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service that passes data carried in signalling channel slots to an SMS unit which can be arranged to provide connectivity to the public Internet 39.

A third data-capable bearer service is provided in the form of GPRS (General Packet Radio Service which enables IP (or X.25) packet data to be passed from the data handling system of the mobile entity 20, via the data interface 24, radio subsystem 21 and relevant BSS 11, to a GPRS network 17 of the PLMN 10 (and vice versa). The GPRS network 17 includes a SGSN (Serving GPRS Support Node) 18 interfacing BSC 14 with the network 17, and a GGSN (Gateway GPRS Support Node) interfacing the network 17 with an external network (in this example, the public Internet 39). Full details of GPRS can be found in the ETSI (European Telecommunications Standards Institute) GSM 03.60 specification. Using GPRS, the mobile entity 20 can exchange packet data via the BSS 11 and GPRS network 17 with entities connected to the public Internet 39.

Different data-capable bearer services to those described above may be provided, the described services being simply examples of what is possible.

The data connection between the PLMN 10 and the Internet 39 will generally be through a firewall 35 with proxy and/or gateway functionality. In FIG. 1, a service system 40 is shown connected to the Internet 40, this service system being accessible to the OS/application 26 running in the mobile entity by use of any of the data-capable bearer services described above. The data-capable bearer services could equally provide access to a service system that is within the domain of the PLMN operator or is connected to another public or private data network.

Whilst the above description has been given with reference to a PLMN based on GSM technology, it will be appreciated that many other cellular radio technologies exist and can typically provide the same type of functionality as described for the GSM PLMN 10.

Another technology for providing mobile data connectivity is that based on wireless LANs. Wireless LANs are gaining substantial acceptance as a means for providing mobile connectivity over a restricted area. FIG. 2 of the accompanying drawings illustrates the main components of a wireless LAN architecture consistent with the ANSI/IEEE Standard 802.11 ("Wireless LAN Medium Access Control and Physical Layer Specifications"). The FIG. 2 wireless LAN 44 comprises a distribution system 45 that serves to interconnect a number of access points (AP) 46 via a network. Each access point 46 connects with mobile stations (MS) 47 over a wireless medium to form a Basic Service Set 48 (BSS1 and BSS2). The totality of the basis service sets and the network that interconnects them is called an Extended Service Set (ESS). The wireless LAN may connect with other networks, including the internet, via a portal 49.

Wireless LANs can be used to provide connectivity over limited areas such as public spaces and publicly-accessible premises, both commercial and non-commercial. These limited areas of connectivity are often referred to as "hotspots" as they generally provide a much higher speed of data transfer to mobile devices than is available via other wireless systems of more general coverage such as the data-capable bearer services provided by cellular radio networks of the form illustrated in FIG. 1.

Whilst such connectivity "hotspots" are presently provided primarily by wireless LANs, other technologies can also be used to provide localised areas of high transfer rates (as compared to the surrounding environment) and as used herein the term "hotspot" is intended to be technology independent, merely indicating that improved data transfer rates are available in localised areas. For example, short-range wireless connectivity can be provided by a "Bluetooth" radio system.

It is an object of the present invention to help a user of a device with multiple wireless connectivity options, to appreciate the likely communication costs that will be incurred according to the quality of experience sought by the user.

SUMMARY OF THE INVENTION

According to one aspect of the present invention, there is provided a communications arrangement comprising:
a mobile device comprising:
a communications subsystem capable of wireless communication using any of multiple different data-transfer services each with an associated cost; and
a service determination subsystem for holding one or more quality-of-experience profiles each specifying, in dependence on one or more parameters, what service is to be used by the communications subsystem, and for using the, or a user-selected one of the, profiles as a currently-active profile; and
a cost prediction subsystem for predicting, on the basis of past data transfers involving said device, communication costs for the device to the end of a current calendar usage period for at least one quality-of-experience profile used as the currently-active profile for future communications.

Preferably, the cost prediction subsystem is operative to predict communication costs for the device to the end of a current usage period for both the actual currently-active profile and at least one other quality-of-experience profile used as the currently-active profile for future communications in said usage period.

Advantageously, the service determination subsystem holds multiple profiles and the arrangement includes means operative, during use of the communications subsystem, to determine for each profile the service amongst the services available, that would be used were that profile the currently-active profile whereby to derive prediction data indicating, for each profile, an estimate of the mix of services that would be used over a period of time if the profile was the currently-active profile. The cost prediction subsystem in subsequently predicting communication costs to the end of the current usage period for a particular said profile, use the relevant prediction data to set the mix of services used in making the prediction for that profile.

A quality-of-experience profile may directly specify at least one particular service to be used, subject to availability. Alternatively, a quality-of-experience profile may specify acceptable download times and/or media quality parameters; in this case, the service determination subsystem is operative to use these parameters to determine a suitable service to use when the profile is the currently-active profile.

The cost prediction subsystem can be incorporated into the mobile device or provided separately (for example, as a remote resource accessible via the communications subsystem of the device).

BRIEF DESCRIPTION OF THE DRAWINGS

Embodiments of the invention will now be described, by way of non-limiting example, with reference to the accompanying diagrammatic drawings, in which:

FIG. 2 is a diagram of a known wireless LAN architecture;

FIG. 3 is a diagram of a mobile device provided with a cost prediction subsystem embodying the present invention;

BEST MODES FOR CARRYING OUT THE INVENTION

Figure 1:
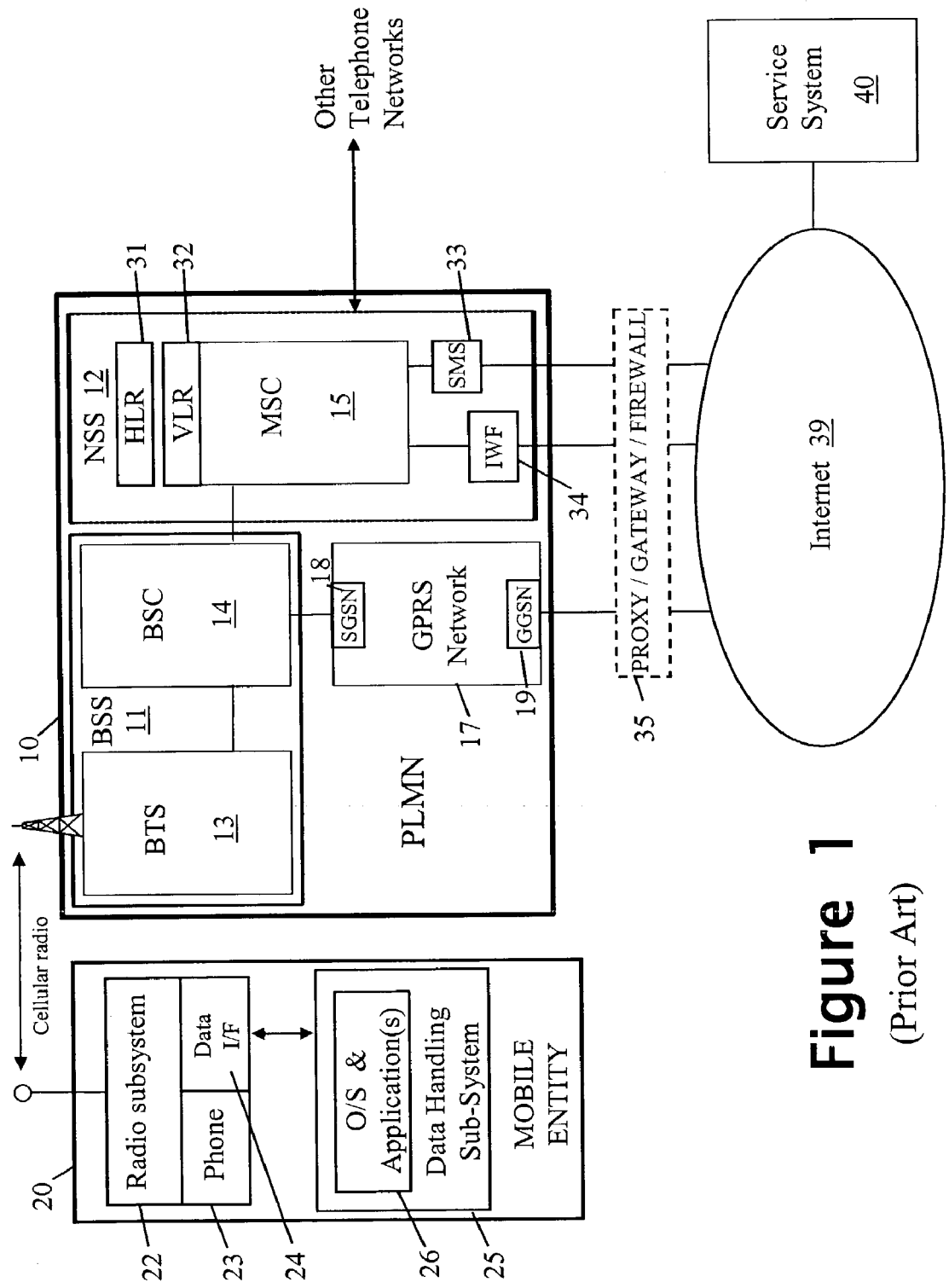
FIG. 1 is a diagram of a known Public Land Mobile Network illustrating three possible data transfer options.

FIG. 3 depicts a user 55 with a mobile device 60 provided with a communications sub-system 61 capable of providing data-transfer connectivity for the device via any one or more of multiple different wireless data-transfer services. In the present example, the communications subsystem 61 has wireless transceivers for communicating with a PLMN 10, a wireless LAN 44, and a Bluetooth-based portal 50. The PLMN 10, wireless LAN 44 and Bluetooth-based portal 50 are each provided with respective interconnection functionality 51, 52, 53 for providing access to the public internet 39 whereby the device 60 can exchange data with a server 40 connected to internet 39.

PLMN 10 provides several different data transfer services (for example, SMS-based, single voice circuit based, and GPRS-based as described above with respect to FIG. 1); in the present example, device 60 is assumed to have access to one or more of these services. The wireless LAN 44 may also make more than one data transfer service available to the device 60 as, indeed, may the Bluetooth-based portal 50. Whilst these various data transfer services will typically be distinguished by different data transfer rates, other parameters may additionally/alternatively serve to distinguish the services such as error rates and cost. It will be appreciated that with a data transfer service provided via a shared media such as a service provided by wireless LAN 44, the data rate of the service can only be meaningfully specified where there is a bandwidth guarantee associated with the service; absent such guarantee, the data transfer rate will be dependent on what other devices are making use of the shared media at the same time. Thus, a data-transfer service over a shared media needs to specify not only the transport but also any level-of-service guarantee.

Where multiple PLMNs are present and accessible by the device 60, equivalent services offered by the PLMNs may be distinguished only by the PLMN identity.

The data transfer services offered by the PLMN 10, wireless LAN 44 and Bluetooth-based portal 50 may individually require pre-registration by the device 60/user 55 or be open to anyone subject to real-time authentication checks as appropriate for operating the billing mechanisms associated with each service. How the services are billed is not itself of concern to the present invention and will not be described herein.

In sum, the device 60 is enabled to use any one or more of multiple data transfer services subject to their availabilities to access data resources(data sources/sinks) such as the server 40. Service availability will, of course, depend on whether or not the device 60 is currently located within the coverage area of a particular service. Thus, whilst device 60 will generally be within the coverage of the PLMN 10 and thus able to use any of the data transfer services provided by the PLMN, the availability of data-transfer services from communication hotspots established by wireless LAN 44 or Bluetooth portal 50 will be much more variable according to the current location of the device. It will be appreciated that although only one wireless LAN 44 and Bluetooth-based portal 50 are shown, there would typically be many wireless LANs 44 and portals 50 within the PLMN coverage area, each providing a communications hotspot (that is, the data transfer services available in these hotspots will generally be higher rate services as compared to the services offered by the PLMN 10, at least for equivalent costs). It will also be appreciated that whilst in FIG. 3 the device 60 is depicted in a context of accessing a server 40 connected to the public internet, the device 60 may use available data-transfer services to access any data resource to which a path can be established; for example, the device may use a data transfer service of PLMN 10 to access a server connected to a GPRS network of the PLMN 10 and not available via the internet 39.

Given that the device 60 will frequently be able to access multiple different data transfer services to exchange data with a remote resource, the device needs to be able to determine which service to use. Additionally, the user also needs to be able to keep track of the costs involved and be able to change the services used to manage communication costs. How these needs are met for the FIG. 3 device will now be described.

The FIG. 3 device 60 comprises, in addition to the communications subsystem 61, a data-handling subsystem 62 for running applications that send/receive data via the data-transfer services made available by the communications subsystem 61, a user interface 63 (typically a display and keypad, though interface modalities such as audio are additionally/alternatively possible), a service determination and monitoring subsystem 64 that selects the data transfer service to be used for a task to be carried out by the data-handling subsystem 62, a first data store 65 associated with subsystem 65 and holding service data and "quality-of-experience" profiles, a cost prediction subsystem 66, and a second store 67 associated with subsystem 66 and holding service usage data and usage prediction data.

The selection of the data transfer service to be used is effected by the service determination subsystem 64 according to a currently-active "quality-of-experience" profile held in store 64. The term "quality-of-experience" (hereinafter "QoE") refers to a measure of the quality of the user experience in respect of data transfers via the communications subsystem 61. Typically, the QoE would reflect download speeds but may also be influenced by other factors such as the quality of a downloaded image as will be more fully explained below. For the present, it will be assumed that the QoE is simply a measure of data transfer speed and that the QoE is given a number of values corresponding to the number of different data transfer rates offered by the data transfer services accessible (subject to availability) by the communications subsystem 61. Thus, for example, if four different rate data-transfer services S1-S4 are available (S1 having the lowest data rate and S4 the highest), then the QoE is given four values, namely QoE1 to QoE4 (QoE1 being the lowest quality and QoE4(K)the highest).

Figure 4:
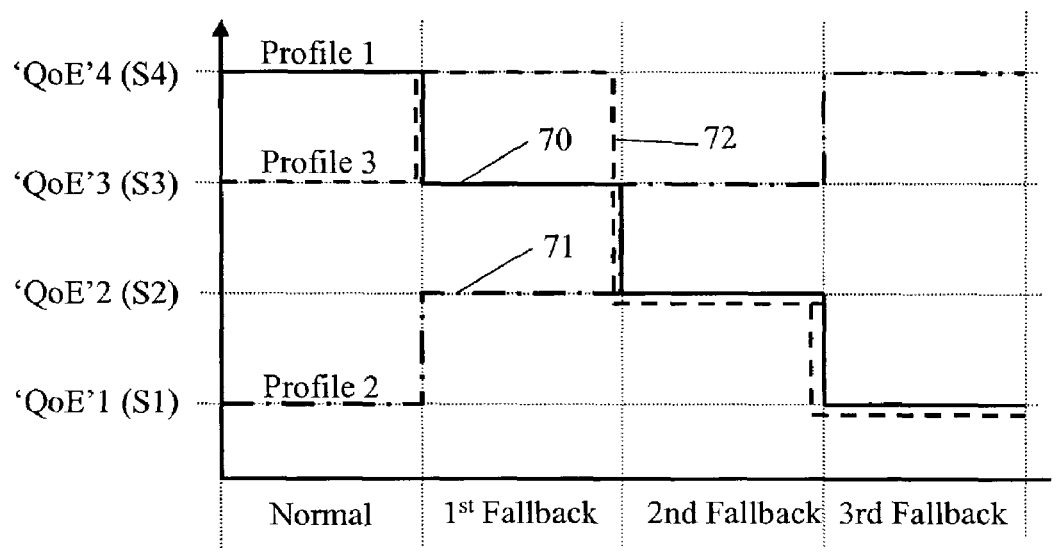
FIG. 4 is a diagram illustrating three different quality-of-experience profiles held by the FIG. 3 mobile device and used by it to determine which available data transfer service to use.

Using these QoE values, the user can specify (or have specified) one or more QoE profiles for determining what services are to be used by the device 60 in dependence on one or more parameters such as type of data to be transferred and the current availability of services. Such a profile can be specified in a variety of ways and FIG. 4 illustrates three profiles each of which specifies a QoE value normally to be used with first, second and third fallback values should the normal, or preceding fallback value be unavailable (in the present example where each QoE value corresponds directly to a particular service S1-S4, a QoE value is unavailable when the corresponding service is unavailable). Of the three illustrated profiles, the first profile 70 (Profile 1) specifies that the highest quality QoE (QoE4—service S4) should be used if available, failing which the second highest quality QoE3 should be used and so on until a QoE value is found to be available. The second profile 71 (Profile 2) specifies the reverse of Profile 1, namely that the lowest quality QoE (QoE1—service S1) should be used if available, failing which the second lowest quality QoE2 should be used and so on until a QoE value is found to be available. The third profile 72 (Profile 3) specifies that the second highest QoE (QoE4) should normally be used if available, failing which the highest quality QoE (QoE4) is to be used and if this is not available, the third highest QoE (QoE2).

Profile 1 thus optimises quality and will generally be the most expensive profile whereas Profile 2 seeks to minimise cost by opting for the lowest quality available; Profile 2 provides an intermediate position though biased in favour of higher quality.

The QoE profiles are set into store 65 by the user using user interface 63 or may be downloaded from a remote source or pre-installed (and possibly edited by the user). The user then selects, via interface 63, one of the profiles as the currently active profile—that is, the profile to be used by the subsystem 64 in determining which service to use; one of the profiles can be automatically designated as a default currently-active profile to handle the situation where the user fails to select a currently-active profile.

In operation of the device 60, the service determination subsystem 64 uses the currently active profile to set the service to be used by the communications subsystem. To this end, the subsystem 64 first instructs the communications subsystem 61 to use the service corresponding to the "normal" QoE specified by the currently-active profile. If this service is not available, the communications subsystem 61 informs the service determination subsystem 64 which understands that the "normal" QoE is not available and uses the currently-active profile to determine the QoE—and thus service—that should next be tried. Subsystem 64 then instructs the communications subsystem to try this next service and so on until an available service is found.

Subsystem 64 also serves to monitor service usage by the communications subsystem 61 and to store service usage data in store 67.

The cost prediction subsystem 66 can be triggered at any time by the user via interface 63 to provide information about existing data-transfer service cosst incurred in a current usage period and to make predictions about future costs to the end of that period on the basis of a particular QoE profile being the currently-active profile for the remainder of the usage period.

Figure 5:
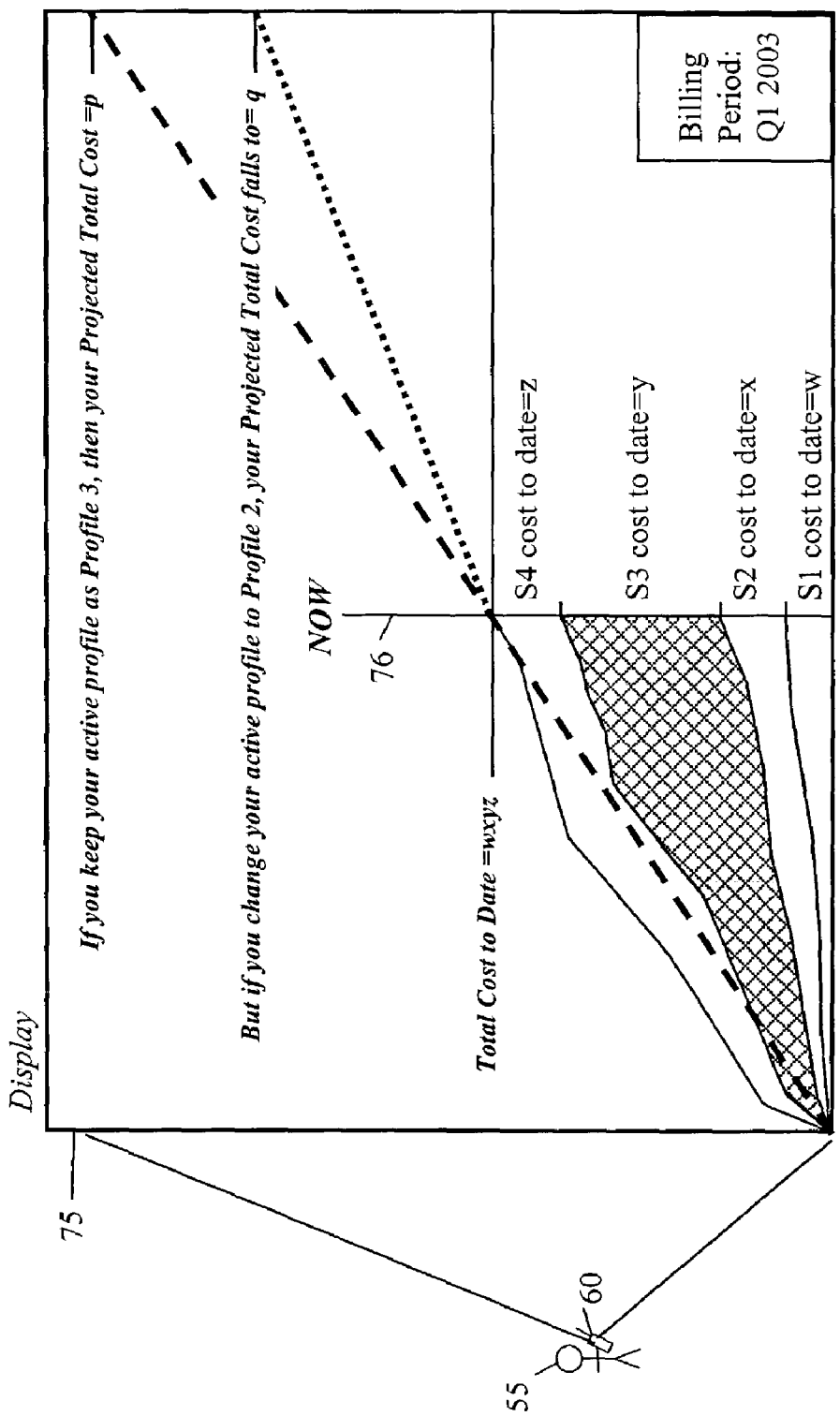
FIG. 5 depicts a cost prediction graph displayed on a display of the FIG. 3 device.

Calculation of the costs incurred to date are effected by the cost prediction subsystem 66 on the basis of the service usage data held in store 67 and service cost data. The service cost data can be stored in store 65 along with other service data, the cost data either being pre-stored at the time of initial registration for a service or received when a service is dynamically engaged; alternatively, the cost prediction unit can be arranged to retrieve cost data from a remote source via the communications subsystem 61. FIG. 5 illustrates an output display 75 produced by the cost prediction subsystem on user interface 63 with the left-hand side of the display 75 (up to the line 76 marked "Now") showing the costs incurred to date. In the illustrated example, the currently-active profile set to date for the current usage period (here, a year quarter) has been Profile 3 of FIG. 4 with the result that most data transfers have been effected using QoE3, that is, service S3—this usage is shown cross-hatched with a cost-to-date of "y". Due to non-availability of service S3 (and other of the services) at certain times when data transfers were effected, the other services S1, S2, and S4 have also been used with respective costs-to-date of "w", "x" and "z".

In the present example, cost prediction is effected by subsystem 66 on the basis that overall data transfer volumes will be proportionately the same for the remainder of the current usage period as for the period to date. A first prediction is made on the basis that the currently-active profile remains the same as currently set (i.e. Profile 3)—in this case the relative usage of the services S1 to S4 are assumed to be the same in the future as for the period to date so that a straight line cost extrapolation can be made (though this made need to be modified to take account of volume discounts and other pricing adjustments on offer to the user). In the present case, a straight line extrapolation gives a total period cost of "p" with Profile 3 remaining the currently-active profile for the remainder of the usage period. It will be appreciated that if the currently-active profile (in this example, Profile 3) has only been used for a part of the period to date, then the relative usage of the services during such part is used as the basis for cost extrapolation.

In the present example, subsystem 66 also makes a cost prediction for Profile 2 as the currently active profile for the remainder of the usage period. It will be recalled that Profile 2 specifies use of the lowest rate (and typically cheapest) data transfer service available. As the lowest rate service is likely to be one offered by the PLMN 10 and always available, the cost prediction for Profile 2 is made on the basis that all data transfers are effected using service S1. As a result, the predicted total cost to the end of the usage period reduces to "q".

The user may also request the cost prediction subsystem 66 to predict costs on the basis of Profile 1 being used as the currently-active profile to the end of the usage period. In this case, the subsystem cannot assume that the highest rate service S4 (the "normal" service to be used in Profile 4) will be available for all future data transfers; instead, the subsystem assumes that the service will only be available for a preset proportion of the transfers. The relative availabilities of services S3, S2 and S1 are deduced from the usages to date of these services.

Rather than the availability of service S4 having to be preset for prediction purposes, in a preferred embodiment means are provided (for example, as part of the service determination subsystem 64) that are operative during use of the communications subsystem 61 to determine for each stored profile the service amongst the services available, that would be used were that profile the currently-active profile whereby to derive, and store in store 67, prediction data indicating, for each profile, an estimate of the mix of services that would be used over a period of time if the profile was the currently-active profile. The cost prediction subsystem 66 in making its predictions for a particular profile, uses the relevant prediction data to set the mix of services used in its predictions of communication costs to the end of the current usage period.

Although as described above the cost prediction subsystem 66 automatically made predictions for each of Profiles 3 and 2 set as the currently-active profile for the remainder of the period whilst the prediction for Profile 1 was only made at user instigation, it will be appreciated that any or all predictions can be made automatically or under user control. Furthermore, although multiples profiles have been described as stored in store 65, it is possible also to have only one profile stored and to arrange for cost predictions to be based on user-specified (or automatically proposed) changes to that profile.

On the basis of the predicted costs presented, the user can decide whether to change the currently-active profile (either by selecting a different one of the stored profiles or by modification of the currently-active profile).

Figure 6:
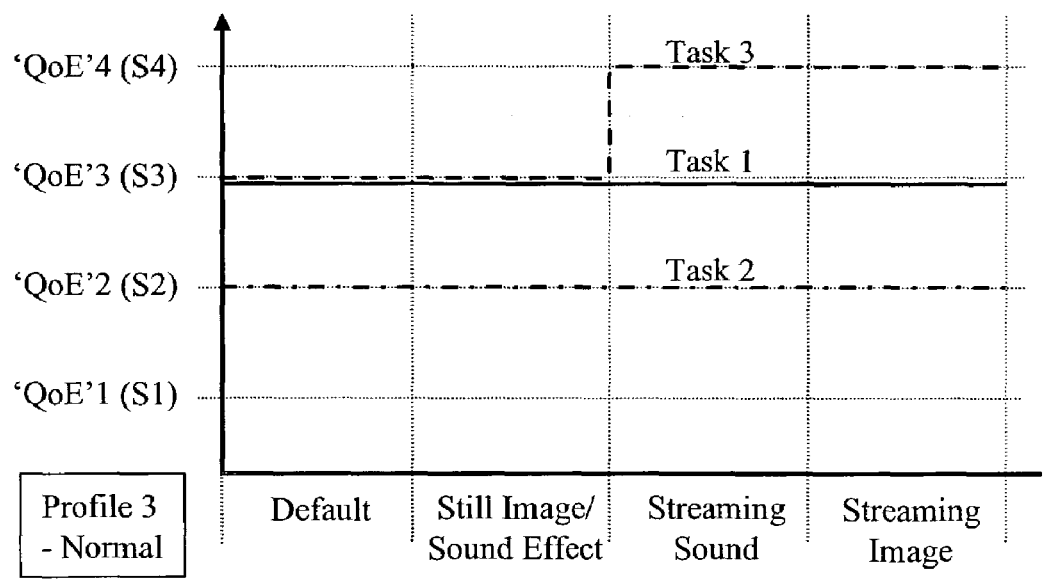
FIG. 6 is a diagram showing a quality-of-experience profile in which the quality of experience specified is dependent on the type of task to be performed and the media type of data to be transferred.

The form of QoE profile shown in FIG. 4 can, of course, be varied. For example, rather than defining multiple fallback positions for each profile, each profile could simply point to another profile as its fallback or simply not specify any fallback (in which case the service determination subsystem 64 can be arranged always to apply a set default policy to select a service or simply abandon trying to establish a connection). Furthermore, a QoE profile can specify that different QoE values be used for different data-transfer tasks to be carried out by the data-handling subsystem 62 and/or for different media types of the data to be transferred. FIG. 6 illustrates such a refinement for the "normal" portion of Profile 3 of FIG. 4; in this case, three different tasks are identified labelled Task 1 (for example, normal internet browsing and miscellaneous data transfers), Task 2 (for example, background data transfers such as of emails) and Task 3 (for example, real time communications with another party). In addition, four media type categories are specified, namely streaming image, streaming sound, still image/sound effect, and all other types. As can be seen, for Task 2, a QoE level of QoE2 is set for all media types whereas for task 3, QoE level QoE4 is set for streaming sound and image and QoE3 is set for all other data types. Service determination subsystem 66 is operative to use such a profile, when currently active, to choose the appropriate data transfer service according to task and data type to be transferred—this may involve causing multiple different services to be used simultaneously or the subsystem 66 can be arranged to choose one service (normally the highest rate service) from amongst multiple services indicated as to be used by the profile.

Figure 7:
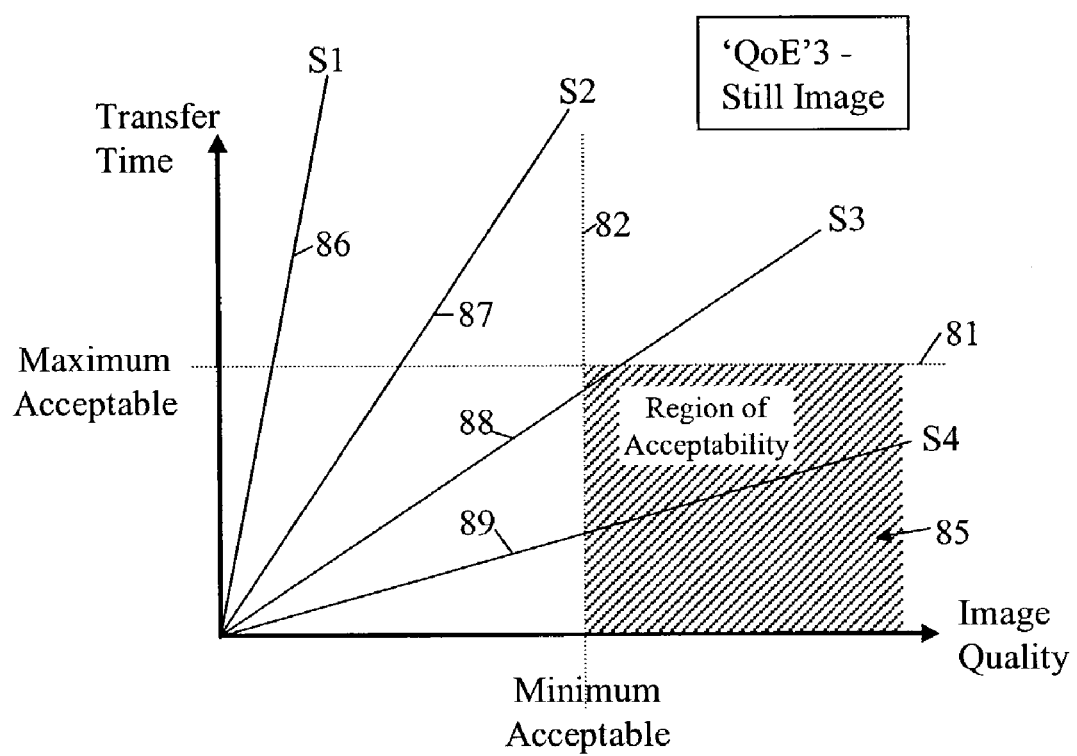
FIG. 7 is a diagram illustrating an example relationship between a desired quality-of-experience and the data transfer service required.

In the foregoing examples, each QoE level has mapped directly to a corresponding service. However, this is not necessarily the case and more complicated relationships between QoE level and service are possible. One such relationship is illustrated in FIG. 7 in relation to QoE level QoE3 specified for a still image (how a QoE level maps to a service can be made dependent on media type and/or other factors). In the FIG. 3 example, QoE3 is defined in terms of a maximum acceptable transfer time per unit image area (see dotted line 81) and a minimum image quality (see dotted line 82)—to meet QoE3 standard, an image must be received with characteristics putting it in hatched area 85. It will be noted that meeting QoE3 is not just a question of choosing a suitable data transfer service to ensure unit image area delivery within a time less than the maximum acceptable time, but also requires an image of suitable quality to be available.

If only one quality of image is available, then this quality may of itself determine whether QoE3 can be met. If the available image quality is acceptable, then a data transfer service must be chosen to ensure download within the maximum acceptable time (per unit image area). In FIG. 7, lines 86-89 represent the transfer times provided by services S1 to S4 respectively for different image qualities—as can be seen only lines 88 and 89 intersect the area 85 indicating that only services S3 and S4 can possibly be used to meet QoE3 standard—whether use of either service will meet the standard will depend on the image quality available (as higher image quality implies higher amounts of data to be transferred).

The image of interest may be available at several different qualities and in this case meeting the QoE3 standard involves selecting an acceptable image quality and a service that can transfer that quality of image in the required time per unit image area. The service determination subsystem in this case not only determines the service to be used but also the quality of image to be transferred. Information on the image quality available can be made available to subsystem 66 through the relevant data-handling application run by subsystem 62 or can be obtained by subsystem requesting this information itself from the image source.

Many variations are possible to the above described embodiments of the invention. In particular the cost prediction subsystem can be provided as a remote resource accessible from device 60 by use of the communications subsystem 61.

It will be appreciated that the service determination subsystem 64 and cost prediction subsystem will typically be provided as program code executing on a processor.

With respect to the service usage data upon which predictions are made by subsystem 66 about future cost, rather than using data derived from data transfers effected during the preceding portion of the current usage period, it is possible to use usage data derived for a previous usage period (in particular for the part of that period corresponding to the remaining part of the current usage period for which a usage prediction is to be made).

The invention claimed is:

1. A communications arrangement comprising:
   a mobile device comprising:
   a communications subsystem capable of wireless communication using one of multiple different data-transfer services each with an associated cost; and
   a service determination subsystem for holding one or more quality-of-experience profiles each specifying, in dependence on one or more parameters, what data transfer service is to be used by the communications subsystem, and for using the, or a user-selected one of the, profiles as a currently-active profile, wherein the service determination subsystem uses the currently-active profile to set the data transfer service used by the communications subsystem; and
   a cost prediction subsystem for predicting, on basis of past data transfers involving said device, communication costs for the device to an end of a current calendar usage period for at least one quality-of-experience profile used as the currently-active profile for future communications.

2. An arrangement according to claim 1, wherein the cost prediction subsystem is operative to predict communication costs for the device to the end of a current calendar usage period for both the actual currently-active profile and at least one other quality-of-experience profile used as the currently-active profile for future communications in said usage period.

3. An arrangement according to claim 2, wherein the service determination subsystem holds multiple profiles, the arrangement including means operative during use of the communications subsystem to determine for each profile the service amongst the services available, that would be used were that profile the currently-active profile whereby to derive prediction data indicating, for each profile, an estimate of a mix of services that would be used over a period of time if the profile was the currently-active profile, the cost prediction subsystem being operative in predicting communication costs to the end of the current usage period for a particular said profile to use a relevant prediction data to set the mix of services used in making the prediction.

4. An arrangement according to claim 2, wherein the service determination subsystem is operative to hold multiple quality-of-experience profiles, the cost prediction subsystem being arranged to use as said at least one other quality-of-experience profile, at least one quality-of-experience profile held by the service determination subsystem that is other than the actual-currently active profile.

5. An arrangement according to claim 2, wherein the cost prediction subsystem is arranged to use as said at least one other quality-of-experience profile, at least one quality-of-experience profile derived by user-specified modification of the actual-currently active profile.

6. An arrangement according to claim 1, wherein the service determination subsystem holds multiple profiles, the arrangement including means operative during use of the communications subsystem to determine for each profile the service amongst the services available, that would be used were that profile the currently-active profile whereby to derive prediction data indicating, for each profile, an estimate of a mix of services that would be used over a period of time if the profile was the currently-active profile, the cost prediction subsystem being operative in predicting communication costs to the end of the current usage period for a particular said profile to use relevant prediction data to set the mix of services used in making the prediction.

7. An arrangement according to claim 1, wherein said quality-of-experience profile directly specifies at least one said service to be used subject to availability.

8. An arrangement according to claim 1, wherein said quality-of-experience profile specifies acceptable download times or media quality parameters, the service determination subsystem being operative to use these parameters to determine a suitable service to use when that profile is-the currently-active profile.

9. An arrangement according to claim 1, wherein said quality-of-experience profile specifies, or is used to determine, said service to be used, subject to availability, according to a current type, of multiple possible types, of communication task to be carried out or media to be transferred using the communications subsystem.

10. An arrangement according to claim 1, wherein said quality-of-experience profile specifies at least one fall-back service to be used in the event that the service initially determined for use is not available.

11. An arrangement according to claim 1, wherein the cost prediction subsystem is part of the mobile device.

12. An arrangement according to claim 1, wherein the cost prediction subsystem is separate from the mobile device.

13. An arrangement according to claim 1, wherein the device further comprises a visual display, the cost prediction unit being operative to output its cost predictions in graphical form using said visual display.

14. A method of determining a data transfer service to be used for a mobile communications device comprising:
    storing one or more quality-of-experience profiles in the mobile communications device, each profile specifying, in dependence on one or more parameters, what data transfer service is to be used by the mobile communications device, and for using a user- selected one of the profiles as a currently-active profile;
    using the currently-active profile to set the data transfer service used by the mobile communications device; and
    predicting, on basis of past data transfers involving said device, communication costs for the device to an end of a current calendar usage period for at least one quality-of-experience profile used as the currently-active profile for future communications.

15. The method according to claim 14, wherein the communication costs for the mobile communications device are predicted to the end of a current calendar usage period for both an actual currently-active profile and at least one other quality-of-experience profile used as the currently-active profile for future communications in said usage period.

16. The method according to claim 14, wherein said quality-of-experience profile specifies acceptable download times or media quality parameters which are used to determine a suitable service to use when that profile is-the currently-active profile.

17. The method according to claim 14, wherein said quality-of-experience profile specifies, or is used to determine, said service to be used, subject to availability, according to a current type, of multiple possible types, of communication task to be carried out or media to be transferred using the mobile communications device.

18. The method according to claim 14 further comprising:
    displaying the predicted communication costs to a user.

19. The method according to claim 14, wherein said quality-of-experience profile specifies at least one fall-back service to be used in event that the service initially determined for use is not available.

20. A system of determining a data transfer service to be used for a mobile communications device comprising:
    means for storing one or more quality-of-experience profiles in the mobile communications device, each profile specifying, in dependence on one or more parameters, what data transfer service is to be used by the mobile communications device, and for using a user-selected one of the profiles as a currently-active profile;
    means for using the currently-active profile to set the data transfer service used by the mobile communications device; and
    means for predicting, on basis of past data transfers involving said device, communication costs for the device to an end of a current calendar usage period for at least one quality-of-experience profile used as the currently-active profile for future communications.

* * * * *

UNITED STATES PATENT AND TRADEMARK OFFICE
CERTIFICATE OF CORRECTION

PATENT NO. : 7,623,843 B2  
APPLICATION NO. : 10/405196  
DATED : November 24, 2009  
INVENTOR(S) : Squibbs Page 1 of 1

It is certified that error appears in the above-identified patent and that said Letters Patent is hereby corrected as shown below:

In Column 2, Line 51, delete "basis" and insert -- basic --, therefor.

In Column 5, Line 61, delete "QoE4(K)the" and insert -- QoE4 the --, therefor.

In Column 6, Line 52, delete "cosst" and insert -- cost --, therefor.

In Column 10, Line 33, in Claim 8, delete "is-the" and insert -- is the --, therefor.

In Column 10, Line 59, in Claim 14, delete "user- selected" and insert -- user-selected --, therefor.

In Column 11, Line 11, in Claim 16, delete "is-the" and insert -- is the --, therefor.

Signed and Sealed this  
Eighteenth Day of December, 2012

David J. Kappos  
*Director of the United States Patent and Trademark Office*